Jan. 17, 1961          F. J. ABRAHAM ET AL          2,968,151
              ACCELERATION RATE CONTROL FOR GAS TURBINES
Filed Oct. 7, 1958                                3 Sheets-Sheet 1

INVENTORS.
FRANK J. ABRAHAM
JOHN R. ANDERSON
BY ROBERT W. TEEL

Reynolds, Beach & Christensen

ATTORNEYS

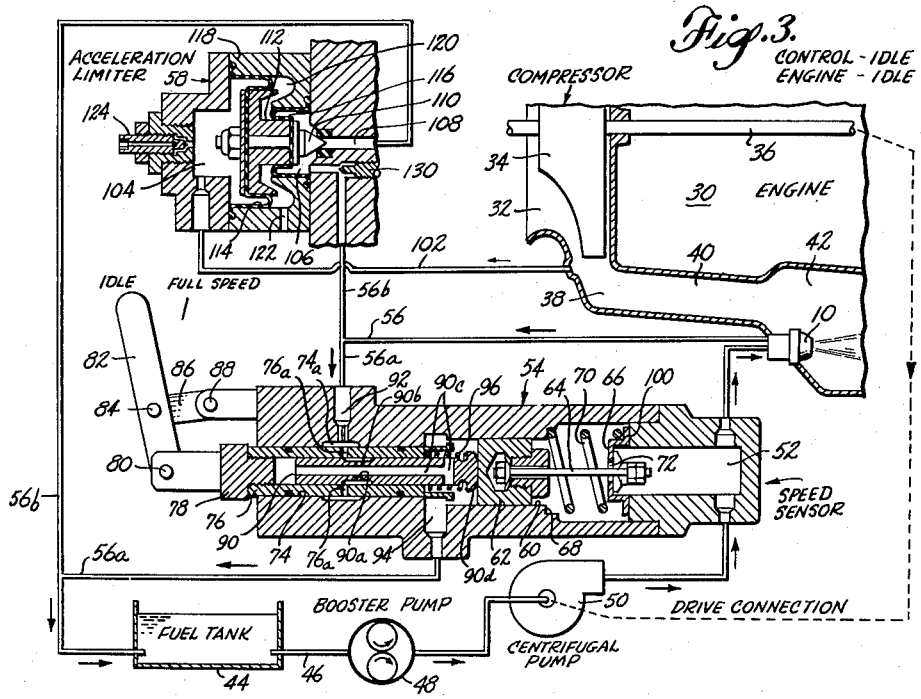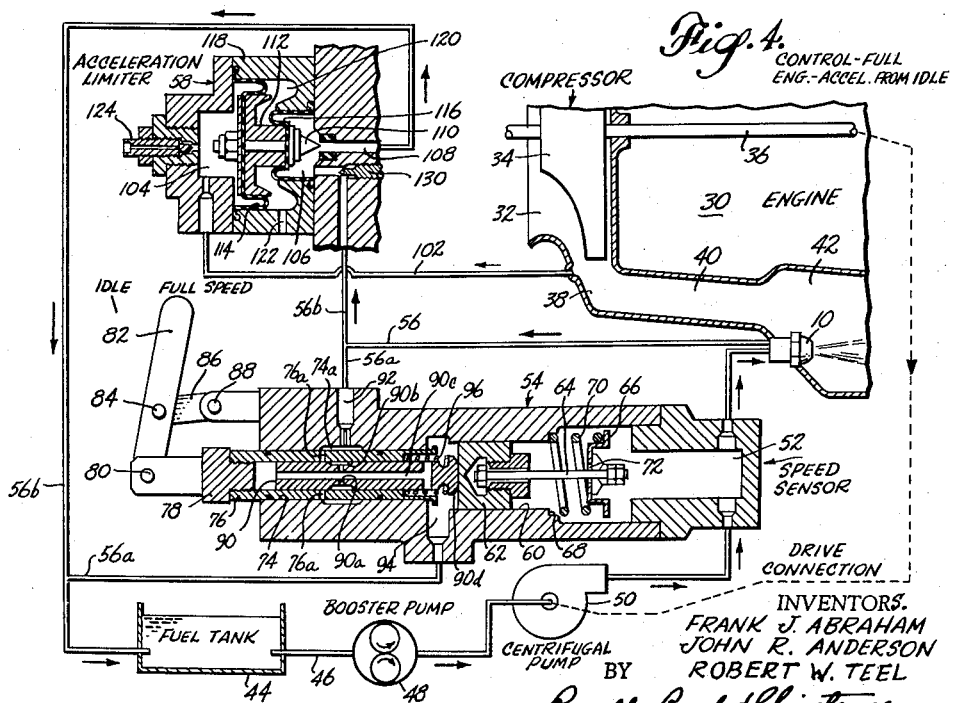

Jan. 17, 1961  F. J. ABRAHAM ET AL  2,968,151
ACCELERATION RATE CONTROL FOR GAS TURBINES
Filed Oct. 7, 1958  3 Sheets-Sheet 3
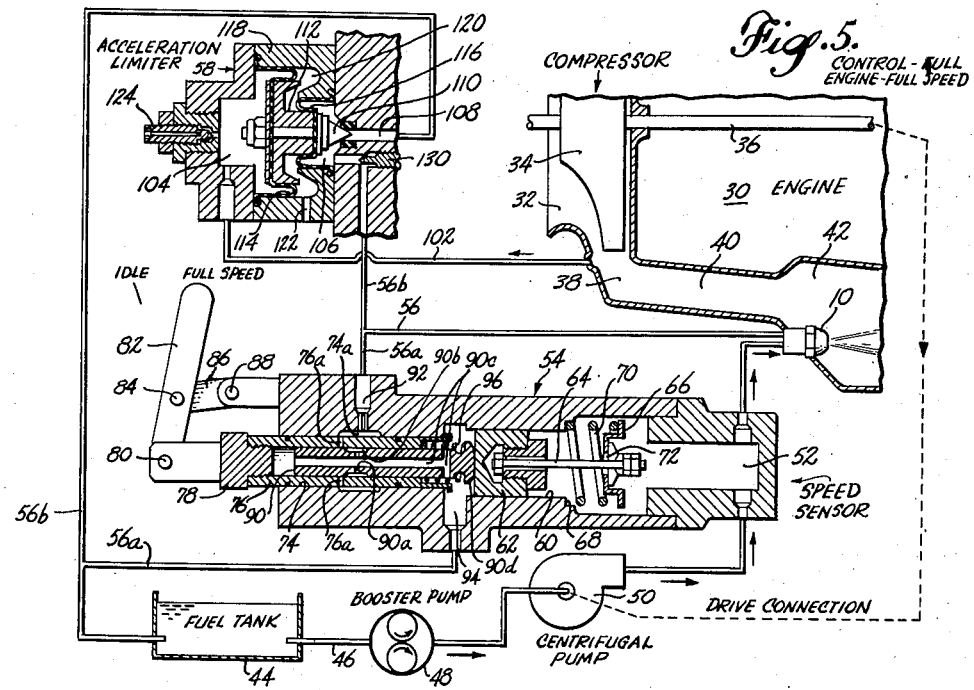
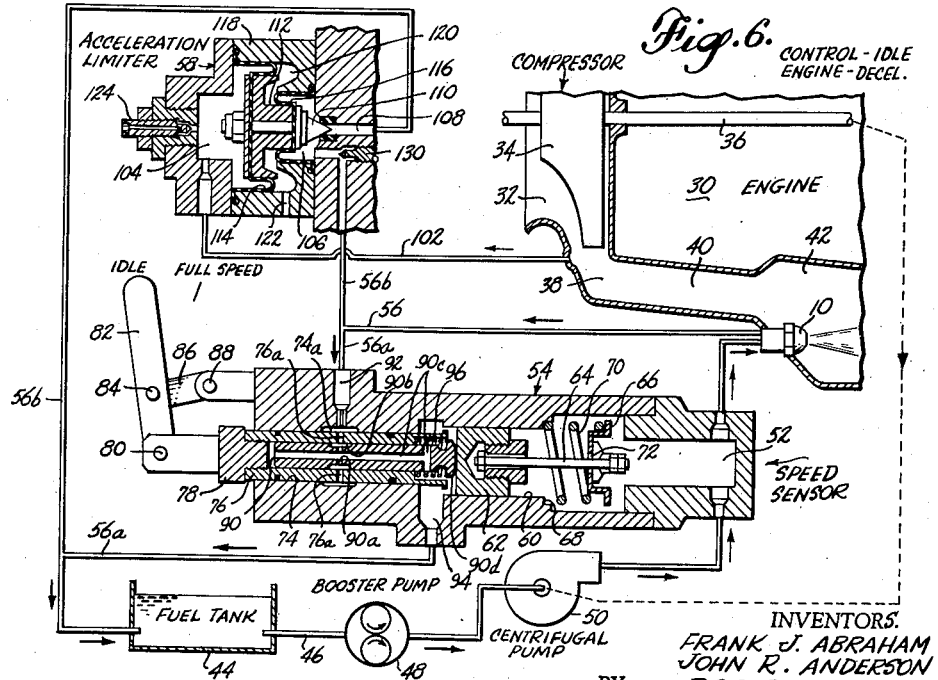
INVENTORS.
FRANK J. ABRAHAM
JOHN R. ANDERSON
ROBERT W. TEEL
BY Reynolds, Beach & Christensen
ATTORNEYS

United States Patent Office 2,968,151
Patented Jan. 17, 1961

2,968,151

ACCELERATION RATE CONTROL FOR GAS TURBINES

Frank J. Abraham, John R. Anderson, and Robert W. Teel, Seattle, Wash., assignors to Boeing Airplane Company, Seattle, Wash., a corporation of Delaware Filed Oct. 7, 1958, Ser. No. 765,820

10 Claims. (Cl. 60—39.28)

This invention relates to improvements in speed control devices for gas turbine engines and more particularly to new and improved means for limiting the fuel injection rate so as to avoid exceeding allowable temperature rise during acceleration of such engines employing by-pass or spill type burner nozzles. The invention is herein illustratively described by reference to the presently preferred form thereof; however, it will be recognized that certain modifications and changes therein with respect to details may be made without departing from the underlying or essential features involved.

In gas turbine engines the fuel pressure requirement varies substantially as the square of speed. A speed regulator suitable for these engines and having some features similar to those of the presently disclosed apparatus appear in Patent No. 2,631,658, March 17, 1953, of Frank J. Abraham. In the present application, which relates to gas turbine engines with by-pass type nozzles, rate of fuel injection into the burners, hence speed and rate of acceleration, is controlled by regulating the restriction in the by-pass line, as explained in detail later herein. However, it is found that in such a speed and acceleration control arrangement, the fuel pressure delivered by the square-law (centrifugal) pump, both to the by-pass nozzle and to the speed regulator, as a reference in the latter, over an intermediate portion of the engine's speed range, causes more fuel to be injected into the burners than is necessary for producing the required acceleration rates. Indeed such an excess amount is injected under these conditions that the turbine inlet temperature rises above the safe operating value which in a typical case may be 1600° F. for example. Stated graphically, the square-law curve of pump pressure as a function of speed has insufficient bend in it to avoid intersecting the curve of speed versus the pressure necessary to generate the maximum safe turbine inlet temperature, such intersection occurring at points which lie at the upper and lower ends of an intermediate speed range. The problem confronted and solved by this invention is a novel means for effectively "bending" the effective burner nozzle square-law pressure curve "down" in the middle or intermediate portion sufficiently to prevent it from crossing the maximum safe turbine inlet temperature curve mentioned above.

Further objects of the invention relate to the provision of practical and efficient apparatus accomplishing the foregoing objective and providing a new and efficient speed control and acceleration (temperature rise) limiting apparatus for gas turbine engines having fuel supply systems of the type described.

Another object is an improved speed sensing and regulating apparatus useful with gas turbine engines having spill type or by-pass type nozzles.

As a refinement, the invention provides a means by which, with simplified acceleration limiting control apparatus, compensation is provided to permit greater amounts of fuel to be delivered to the burner nozzle at higher speeds by limiting the flow of fuel by-passed at higher pressures.

In accordance with important features of this invention, there is provided in the by-pass or return from the burner nozzle to the fuel source means not only to provide a speed-regulating flow restriction adjustable at will to vary the engine speed by varying the build up of back pressure in the by-pass, but also an acceleration limiter comprising a relief valve providing a bleed path around said variable flow restriction. Such relief valve, preferably situated in a separate branch of the by-pass line, is actuated toward open position by a force derived from fuel pressure in the by-pass and, opposingly, toward closed position by a force derived from the air pressure in the collector engine compressor. It is found that due to pressure recovery in the diffuser of the engine at high flow rates, the compressor air pressure curve uniquely approximates the required shape to achieve the necessary acceleration-limiting correction of fuel pressure when utilized in the described manner and when a multiplying factor is employed in the balancing of these pressures so as to provide oppositely acting forces which are in substantial equilibrium at the desired cross-over points at the upper and lower ends of the intermediate speed range throughout which acceleration limiting is required.

These and other features, objects and advantages of the invention, including details of the preferred embodiment, will become more fully evident from the following description thereof by reference to the accompanying drawings.

Figure 3 is a simplified mechanical drawing, partly schematic, illustrating the improved fuel supply control of this invention, in the idle speed condition.

Figure 4 is a similar view with the speed control calling for full speed from the engine and with the engine accelerating from the idle condition.

Figure 5 is a similar view with the control calling for full speed from the engine and with the engine operating at full speed.

Figure 6 is a similar view with the control set in the idle position and with the engine decelerating toward the idle speed condition.

Figure 1:
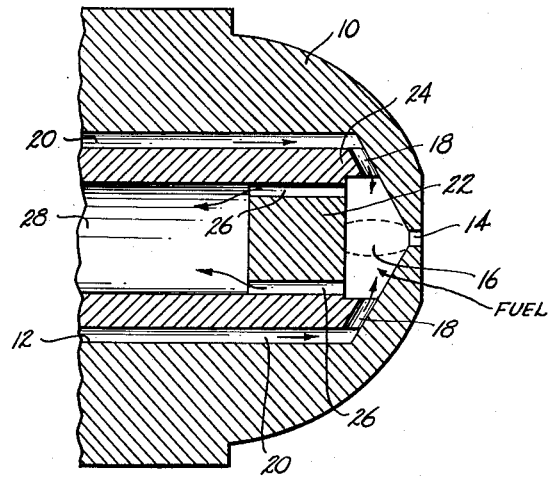
Figure 1 is a simplified sectional view illustrating the principle of construction and operation of a typical by-pass or spill type burner nozzle.

Reference is made to Figure 1 briefly for an understanding of the operating principle of a typical by-pass type burner nozzle with which the controls of the present invention are associated. The nozzle casing 10 has a central bore 12 opening through a small spray port 14 in the end thereof. Behind the spray port 14 the end of the bore 12 may have a conical form, tapering toward the port. Into this conical chamber 16, which forms a swirl chamber, fuel is injected in generally tangential directions through a plurality of swirl ports 18 spaced at intervals around the periphery of the swirl chamber 16 and supplied through a feed passage or passages 20 from a supply source. The base and peripheral walls of the swirl chamber 16 are formed by fittings 22 and 24, respectively, the latter having one or more exit passages 26 extending from locations near the perimeter of the swirl chamber base to the interior space 28 within the fitting 24, such space 28 comprising a by-pass passage carrying spillage or by-pass flow from the swirl chamber back to the fuel supply source.

Because of the tangential arrangement of the swirl ports 18, the fuel assumes an annular form rotating at high speed in the swirl chamber. Centrifugal pressure resulting from this rotation forces the fuel out through the exit ports 26 and into the by-pass at a rate which is limited by the back pressure built up in the by-pass 28, the actual rate of such return flow being largely determined by the difference in pressures between chambers 28 and 16. This difference may be regulated in turn by varying the amount of restriction impeding flow in the by-pass line connecting the chamber 28 with the return side of the fuel source. By increasing the effective restriction in the by-pass line the inside diameter of the rotating body of fuel in the swirl chamber 16 decreases until a balanced condition is reached wherein the centrifugal pressure of this fuel is sufficient to match the increased back pressure resulting from the increased restriction in the by-pass. Conversely, decreasing the restriction in the by-pass results in an increase in the inside diameter of the swirling body of fuel in the swirl chamber and less discharge through the spray port 14, until a balanced condition is reached. If the by-pass is closed altogether, the nozzle operates as a simplex nozzle injecting fuel into the burner at maximum rate. At all speeds, the swirling fuel in the swirl chamber produces a spray discharge through the port 14, and efficient combustion in the engine burner. By design, the fuel pressure from the centrifugal pump (to be described) at maximum speed is arranged to be sufficiently high (with the nozzle starting to operate as a simplex nozzle) that the engine reaches maximum speed without difficulty. The lower centrifugal pump pressure at idling and intermediate speeds, respectively, are sufficiently greater than engine steady state needs to provide the required amount of acceleration with the by-pass closed or substantially restricted. These and other nozzle and pump design considerations, forming no limiting features of the invention proper, will be evident to those skilled in the art as the description proceeds.

Figure 2:
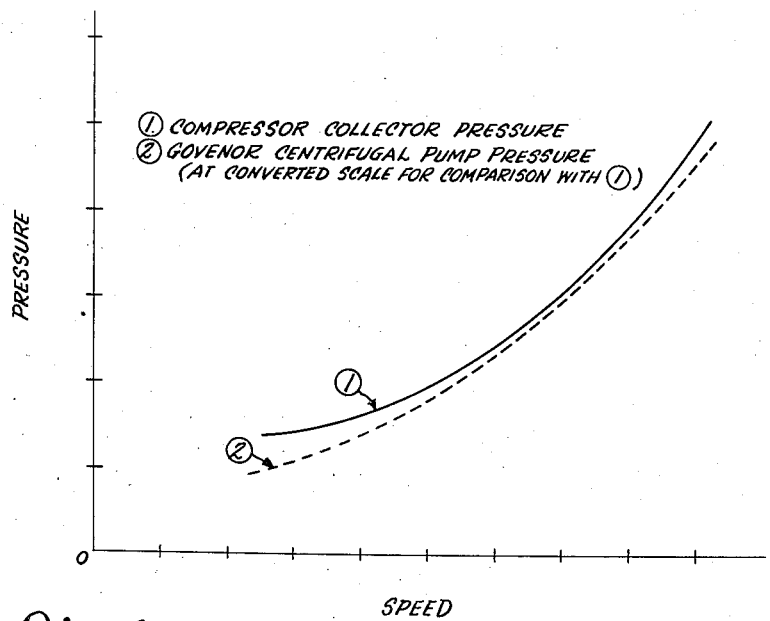
Figure 2 is a graph showing typically the relationship between governor centrifugal pump pressure and engine compressor collector pressure of a gas turbine engine.

In Figure 2 the curve of governor centrifugal pump pressure represents a square-law function of engine speed. However, with a by-pass type nozzle having a square-law referenced speed-regulating flow restrictor in the by-pass line, there is an intermediate portion of the speed range in which, in the absence of special compensating provisions, back pressure in the by-pass becomes excessive for reasons mentioned above. The curve representing engine compressor pressure uniquely provides a substantially ideal reference or basis for compensation to prevent excessive temperature rise and correlated excessive acceleration rates throughout this intermediate speed range in accordance with important features of this invention.

Referring to Figures 3 to 6, inclusive, the gas turbine engine is shown only in part and is generally designated 30. Air enters through the passage 32 and is compressed by a compressor rotor 34 mounted on a turbine driven shaft 36, the turbine not being shown. The compressed air is collected in the annular chamber or collector ring 38 and from there flows rearwardly through the annular passage 40 to the burner chamber 42 wherein one or more nozzles 10 are mounted of the by-pass type.

The fuel tank 44 comprises the source from which fuel is drawn by way of conduit 46, preferably by a positive displacement (gear type) pump 48 and thereafter by a centrifugal type pump 50, much according to the arrangement disclosed and claimed in the copending patent application of Frank J. Abraham Serial No. 477,851, filed December 27, 1954. In passing to the nozzle inlet 20 (Figure 1), the fuel is led through a pressure chamber 52 formed in one end of the casing of the speed regulator or governor unit 54 as shown. Fuel not discharged into the burner from the spray port of the nozzle is returned to the source 44 through by-pass line means including the by-pass 28 (Figure 1) and the by-pass line or conduit 56 having the two branches 56a and 56b. The net effective flow restriction set up in the by-pass of course determines back pressure built up in the nozzle 10 and thereby the rate of fuel discharge from the nozzle into the burners.

Before describing the construction and operation of the speed regulating unit 54, representing the primary flow restrictor in the by-pass, and of the acceleration limiter unit 58, representing the compensating or supplemental flow restrictor in the by-pass, it is well to recognize that the centrifugal pump 50 provides a control reference pressure in chamber 52 which is the required square-law function of engine speed. This pressure is sensed by the regulator unit 54 as a signal of speed and the regulator automatically reduces or increases the restriction in the by-pass in order to hold a desired pressure and thus a desired speed within the limits of allowable droop of the control characteristic of the unit. In order to insure that centrifugal pump pressure shall bear a consistent relationship to speed independently of rate of flow of fuel, the centrifugal pump is designed without usual provisions for increasing pressure from diffusion and with sufficiently large passageways that the effects of fluid friction at even the highest flows expected will be negligible. Consequently, the output pressure of the pump fed into the chamber 52 will be substantially proportional to the square of speed.

Behind the pump pressure chamber 52 in the governor unit 54 is a cylindrical bore 60 and a pressure-actuated piston 62 slidable lengthwise in such bore. The piston is connected to a rod 64 which in turn carries a stop collar 66 on its projecting end. Reacting between the stop collar and a shoulder 68 at the end of the bore adjacent the chamber 52 is a helical compression spring 70. The stop collar 66 has openings 72 which permit free passage of fluid from the chamber 52 into the space next to the adjacent side of the piston 62 so that the pressure of fuel in the chamber 52 acts against the piston in a direction tending to produce compression of the spring 70. The amount of compression of the spring is of course a function of pressure in chamber 52, and since the spring compression force is linearly proportional to displacement, by Hook's law, and since pressure in chamber 52 is a function of the square of engine speed, the piston will be displaced in the direction away from the chamber 52 by an amount bearing a direct relation to engine speed.

At the opposite side or end of the piston 62 and in coaxial alignment with the bore 60 is a bore 74 slidably receiving a control sleeve 76. The outer end of this control sleeve carries a fitting 78 which is connected by a pivot 80 to a control lever 82. The latter has an intermediate fulcruming pivot 84 connected by a link 86 to a stationary pivotal support 88 mounted on the control unit housing as shown. The control lever 82 is operable at will to increase or decrease the engine speed in a manner and by means which will now be described.

The sleeve 76 has one or more side openings 76a through its wall intermediate its ends. Within this sleeve 76 is a smaller sleeve 90. The smaller sleeve 90 slides longitudinally within the sleeve 76 and has one or more side openings 90a through its wall intermediate its ends. The openings 90a are effectively widened, lengthwise of the sleeve 90, preferably by a circumferential groove 90b, at the surface of this sleeve which slides in contact with the inside surface of sleeve 76, as shown. This groove or port 90b provides a substantial range of relative longitudinal movement between the coacting sleeves 76 and 90 over which there will be communication through the openings 76a and 90a. In the surface of bore 74 surrounding the sleeve 76 is annular groove 74a of substantial breadth measured lengthwise of the sleeves, and the range of movement of the sleeve 76 established by the control lever 82 is confined so that the openings 76a are always in registry with this groove hence in communication with the nozzle by-pass. By-pass fuel from the nozzle is introduced into the groove 74a through a passage 92.

An outlet chamber 94 is formed in the unit 54 between piston 62 and the coacting sleeves and is connected to the return side of fuel source 44 through a length of the branch conduit 56a. By-pass fuel may enter this outlet chamber through the branched longitudinal passage 90c in the inside sleeve 90. The end of the sleeve 90 has a head 90d which bears in contact with the adjacent end face of the piston 62 and is maintained in this position by a light and flexible spring 96.

In Figure 3 it will be noted that the control lever 82 is set in the idle position and that the piston 62, subjected to minimum pressure from fuel in chamber 52, occupies its extreme position nearest the pressure chamber 52, such position being established by contact between the stop collar 66 and the shoulder 100. In this position of the piston 62 and of the control sleeve 76, the groove 90b in the follow-up sleeve 90 overlaps the side openings 76a in the control sleeve. Consequently, free and relatively unrestricted flow of by-pass fuel is permitted through the regulator unit 54, passing first through the inlet 92, thence through the groove 74a, through the side openings 76a, through the groove 90b, through openings 90a, passages 90c, and finally through the chamber 94. As a result, the setting of the elements shown in Figure 3 is such that back pressure developed in the by-pass nozzle 10 is at a minimum and in equilibrium with pump pressure in the regulator 54, with the amount of fuel discharged through its spray port then being only that necessary to maintain the engine operating at idle speed.

In order to increase engine speed, such as from idle to full speed, the control lever is operated to the position shown in Figure 4, which withdraws the side openings 76a out of registry with the ports 90b, thereby cutting off all by-pass flow through the regulator unit 54. This immediately builds up the back pressure in the by-pass nozzle 10 and produces a heavier discharge of fuel into the burners, the rate of discharge being proportional to the centrifugal pump pressure. As speed incerases under this increased flow of fuel, the pressure in chamber 52 correspondingly increases in proportion to the square of speed, thereby displacing the piston 62 progressively to the left. At an intermediate stage of this movement, the elements appear as in Figure 4, the piston 62 driving the inside sleeve 90 progressively after the movement of the control sleeve 76 in a follow-up fashion. The follow-up movement of the sleeve 90, effected by the piston 62 as engine speed increases, terminates when the engine speed reaches its attainable maximum limited by existing load conditions or when the groove 90b is again in overlapping relationship or registry with the side openings 76a thereby reducing the restriction in the by-pass 56, whichever occurs earlier. The amount of overlap of the port groove 90b with the openings 76a finally reached is that which produces an equilibrium condition about which the device regulates in order to maintain speed substantially constant at the newly assigned value. Any tendency for the speed to drop results in a decrease of pressure in chamber 52 and an accompanying movement of the follow-up sleeve 90 to increase the flow restriction in the by-pass. This increase in flow restriction automatically increases the back pressure in the nozzle 10 and results in greater fuel injection into the burner and an increase of speed back toward the assigned value. The reverse action occurs should speed tend to rise above the assigned value. This regulating action occurs at all assigned values of engine speed and may or may not take place at the very top speed, depending on whether the actual maximum speed attained under existing load conditions is sufficient to drive the follow-up sleeve to the point where port 90b again registers with openings 76a.

For reasons previously described, the speed control arrangement described provides excessive fuel to the engine during acceleration through an intermediate portion of the speed range, and it is desired to relieve the back pressure in the nozzle throughout that speed range sufficiently to prevent excessive rise of temperature in the burners or at the turbine inlet. This is accomplished in accordance with this invention by providing a relief valve means, preferably in a second branch 56b of the by-pass, which is responsive to an operating condition of the engine in order to reduce effectively by-pass flow restriction when and as required for that purpose. In the preferred embodiment, collector pressure in the compressor 38, 34 is employed to advantage by tapping an air conduit 102 into the collector 38 and extending this conduit to an air pressure chamber 104 in the compensating or acceleration limiter unit 58. This unit also incorporates a fuel pressure chamber 106, interposed in by-pass branch 56b and having an outlet 108 which serves as a valve port closable by a conical valve 110. The latter is mounted on or connected to an actuating piston 112 which is carried by and between two rubber diaphragms, one a relatively large diaphragm 114 facing into the air pressure chamber 104 and the other a relatively small diaphragm 116 facing into the fuel pressure chamber 106. The ratio of areas of these diaphragms corresponds substantially to the ratio of fuel pressure in the by-pass to air pressure in the compressor collector 38 at the upper and lower ends of the intermediate range of engine speed throughout which it is desired to relieve back pressure in the nozzle 10 sufficiently to prevent over-acceleration or overheating of the engine. This ratio, in a typical case, is approximately 4 to 1. A stepping of the inside diameter of the chamber wall section 118 within and to which the diaphragms are attached provides the required area relationship.

The space 120 between the diaphragms 114 and 116 is exhausted to atmosphere through a port 122 so as to prevent modification of the operating characteristics of the acceleration limiter 58 by entrapped air pressure. A bleed valve 124 opens into the atmosphere from the air pressure chamber 104 in order to permit limited flow of air to and from the confined spaces within the air supply conduit 102 and the chamber 104. This relief or bleed valve is adjustable and provides means for obtaining a fine adjustment in the balance between the diaphragms, compensating for any slight design discrepancies in the area ratio of these diaphragms or in accordance with changes in operating conditions.

It will be evident that with such an acceleration limiter the conical valve 110 is opened by the harnessed force of fuel pressure exceeding that of air pressure in the respective chambers 106 and 104 as the engine speed rises to the point where relief of back pressure in the nozzle 10 is required to prevent overheating and over-acceleration of the engine. Moreover, subsequent reclosing of this valve occurs when the speed has risen above the intermediate portion in which temperature and acceleration limiting is required. For different engines, these points of equilibrium and consequent opening and reclosing of the valve 116 with increasing speed and oppositely with decreasing speed may be determined by adjusting bleed valve 124.

If desired, the carrier piston 112 could be maintained in a neutral position by spring means or by employing relatively stiff rubber-like resilient diaphragms 114 and 116 so that instead of producing a simple on-off action of the relief valve 110 a progressive action is achieved providing more or less proportional control of the displacement of the valve from its seated position as a function of deviations of the pressure ratio in the chambers 104 and 106 from one side of an equilibrium condition. Further, if desired a light biasing force may be used, either by way of diaphragm design or by way of a light return spring tending to maintain the valve 110 normally closed.

Preferably, an acceleration rate adjustment valve or flow restriction 130 is incorporated in the by-pass branch 56b as shown, comprising an adjustable needle or conical valve which provides an orifice of a form which limits the flow through the by-pass branch 56b by progressively greater amounts at higher pressures. This valve 130 is provided to vary the effect of the acceleration limiter. Some variability by such a means is desirable due to the fact that some engines can safely be permitted to accelerate at a faster rate than others without excessive temperature rise.

It will therefore be seen that the invention provides a novel speed regulator for gas turbine engines of the type employing by-pass burner nozzles, with provisions for limiting excessive temperature increase during acceleration of the engine and with provisions for regulating engine speed at any of different assigned values established at will by the operator. The controls in the apparatus involved are reliable in operation, simple in construction and provide the necessary fuel pressure variations adequate to meet the operating needs of the engine throughout its entire speed range and under different conditions of operation. These and other aspects of the invention will be evident to those familiar with this art.

We claim as our invention:

1. In combination with a gas turbine engine having an air compressor and a by-pass type burner nozzle, a fuel source, fuel pump means driven by the engine and operable thereby to deliver fuel from said source to said nozzle at a pressure substantially proportional to the square of engine speed, by-pass line means having two branches returning fuel from said nozzle to said source, said compressor over an intermediate portion of the engine's speed range producing an air-pressure proportionate rate of increase with increasing speed which is first less and then greater than the proportionate rate of increase of fuel pressure in said by-pass line, an acceleration limiter comprising valve means comprising a variable restriction in one of said by-pass branches, first actuating means responsive to compressor air pressure urging said valve means toward closed position, and second actuating means responsive to by-pass line fuel pressure urging said valve means open and being in substantial equilibrium with the first actuating means at upper and lower speeds of an intermediate speed range of the engine, whereby the opening of said valve means is greater substantially throughout said intermediate speed range than otherwise, and flow restricting means in the other of said by-pass branches, operable to present a flow restriction therein variable at will to change the engine speed over an operating range thereof.

2. The combination defined in claim 1, wherein the flow restricting means includes two coacting valve elements, one movable at will into different positions relative to the other, to increase or decrease the flow restriction presented thereby, and regulating means actuated in response to changes in fuel pump pressure and connected to said other valve element for actuating the same in a manner tending to produce a decreased flow restriction with increase of engine speed, and vice versa, thereby to regulate engine speed at different values selected by the setting of the first valve element.

3. In combination with a gas turbine engine having an air compressor and a by-pass type burner nozzle, a fuel source, fuel pump means driven by the engine and operable thereby to deliver fuel from said source to said nozzle at a pressure substantially proportional to the square of engine speed, by-pass line means having two branches returning fuel from said nozzle to said source, said compressor over an intermediate portion of the engine's speed range producing an air-pressure proportionate rate of increase with increasing speed which is first less and then greater than the proportionate rate of increase of fuel pressure in said by-pass line, an acceleration limiter comprising valve means comprising a variable restriction in one of said by-pass branches, first actuating means responsive to compressor air pressure urging said valve means toward closed position, and second actuating means responsive to by-pass line fuel pressure urging said valve means open and being in substantial equilibrium with the first actuating means at upper and lower speeds of an intermediate speed range of the engine, whereby the opening of said valve means is greater substantially throughout said intermediate speed range than otherwise, and speed control means including members cooperating to present a flow restriction in the other of said branches, means operable at will to move one of said members relative to another to open and close said flow restriction and thereby effect decrease and increase of engine speed, respectively, and speed regulating means including positional followup means operatively engaging said other member to move the same after the first member, including actuating means responsive to pump pressure to effect reopening of said flow restriction as the engine speed increases following closure thereof by said control means, and spring means yieldably opposing such reopening movement and effecting reclosure of said flow restriction as the engine speed decreases following opening of said flow restriction by said control means.

4. The combination defined in claim 3, and adjustable orifice means interposed in said other branch effectively in series with said flow restriction therein, said orifice means being adjustable to vary the rate of acceleration attainable by the engine.

5. The combination defined in claim 3, and orifice means interposed in said other branch effectively in series with said flow restriction therein, said orifice means being of a type limiting the flow through such branch progressively as speed hence by-pass pressure increases.

6. The combination defined in claim 3, wherein the acceleration limiter comprises means forming two chambers one comprising an air pressure chamber connected to the engine compressor and the other a fuel pressure chamber connected to the by-pass line means, the first and second actuating means comprising diaphragms subjected respectively to the pressures in said chambers and arranged to be actuated in mutually opposite directions thereby, the effective area of the air chamber diaphragm being sufficiently larger than that of the fuel chamber diaphragm to establish said force equilibrium therebetween, the valve means being connected to both diaphragms to be actuated by the resultant force therefrom.

7. The combination defined in claim 3, wherein the speed control means comprises a casing having a bore therein with a side opening therein intermediate the ends of said bore, communicatively connected into said other branch, said casing having a second opening spaced from said first opening lengthwise of said bore and also communicatively connected into said other branch whereby fuel flowing through said branch passes successively through one of said openings, said bore and the other of said openings, one of the flow-restriction defining members comprising a sleeve longitudinally slidable in said bore, the other such member comprising a smaller sleeve longitudinally slidable in the first sleeve, each of said sleeves having an opening through its wall intermediate its ends, said sleeve openings being movable into and out of registry with each other with the larger sleeve's opening remaining in registry with the side opening in said bore, the breadth of one of said sleeve openings measured lengthwise of the sleeve in the surface thereof in sliding contact with the other sleeve materially exceeding the corresponding breadth of the other sleeve opening in its corresponding surface, the smaller sleeve having a bore affording communication from its side opening into the second opening in the casing.

8. In combination with a gas turbine engine having an air compressor and a by-pass type burner nozzle, a fuel source, fuel pump means driven by the engine and operable thereby to deliver fuel from said source to said nozzle at a pressure substantially proportional to the square of engine speed, by-pass line means returning fuel from said nozzle to said source, means comprising a variable flow restriction in said by-pass line means operable at will to vary the restriction to flow therein and thereby the back pressure built up in the nozzle, controlling rate of fuel discharge into the engine by said nozzle, and acceleration limiter means in said by-pass means operable over an intermediate portion of the engine's speed range to restrict the build up of back pressure in said nozzle, thereby to reduce the engine temperature increase during engine acceleration through said intermediate portion, said acceleration limiter comprising a relief valve providing a bleed path around said variable flow restriction, and pressure-actuated means for opening said relief valve, said latter means being responsively connected to a point of air pressure in the engine compressor and to a point of fuel pressure in the by-pass ahead of said variable flow restriction and adapted to be actuated in response to the difference between forces proportional to the respective pressures.

9. In combination with a gas turbine engine having an air compressor and a by-pass type burner nozzle, a fuel source, fuel pump means driven by the engine and operable thereby to deliver fuel from said source to said nozzle at a pressure substantially proportional to the square of engine speed, by-pass line means returning fuel from said nozzle to said source, means comprising a variable flow restriction in said by-pass line means operable at will to vary the restriction to flow therein and thereby the back pressure built up in the nozzle, controlling rate of fuel discharge into the engine by said nozzle, and acceleration limiter means comprising a pressure relief valve connected between said nozzle and the return side of said source, including means responsive to a function of engine speed, operable over an intermediate portion of the engine's speed range to restrict the build up of back pressure in said nozzle, thereby to reduce the engine temperature increase during engine acceleration through said intermediate portion.

10. A system for controlling fuel injection rate in a gas turbine engine having an air compressor and a by-pass type burner nozzle, said system including a fuel source, engine-driven pump, means delivering fuel to the engine at a pressure proportional substantially to the square of engine speed, a by-pass means returning fuel from the nozzle to said source, control means to vary the restriction to flow in said by-pass at will and thereby vary the fuel injection rate, and a relief valve in the by-pass means differentially responsive to pressure in the air compressor and to fuel pressure created by the fuel pump, said relief valve being operable by a relative increase of said air pressure in relation to said fuel pressure over an intermediate portion of the engine's speed range to decrease the restriction to flow in said by-pass independently of said control means.

References Cited in the file of this patent

UNITED STATES PATENTS

| | | |
|---|---|---|
| 2,619,163 | Wynne et al. | Nov. 25, 1952 |
| 2,667,743 | Lee | Feb. 2, 1954 |
| 2,668,416 | Lee | Feb. 9, 1954 |
| 2,673,604 | Lawrence | Mar. 30, 1954 |
| 2,738,003 | Carey | Mar. 13, 1956 |
| 2,841,957 | Thorpe et al. | July 8, 1958 |